S. E. HOLDZKOM.
HANDLE FOR CANES, UMBRELLAS, AND OTHER ARTICLES.
APPLICATION FILED DEC. 6, 1915.
1,196,545.
Patented Aug. 29, 1916.
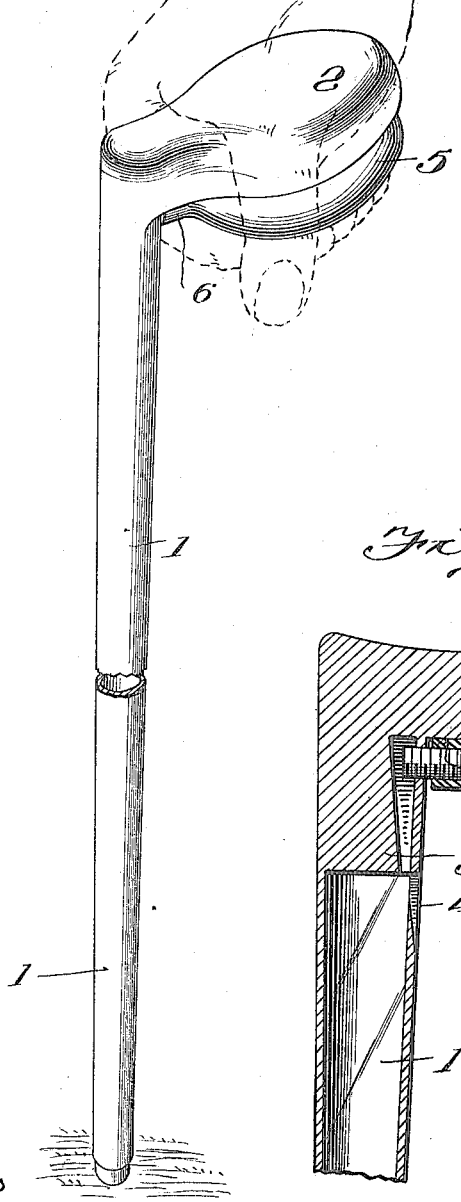
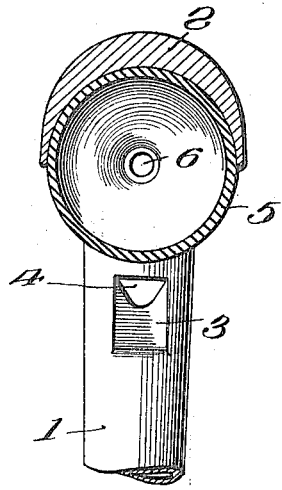
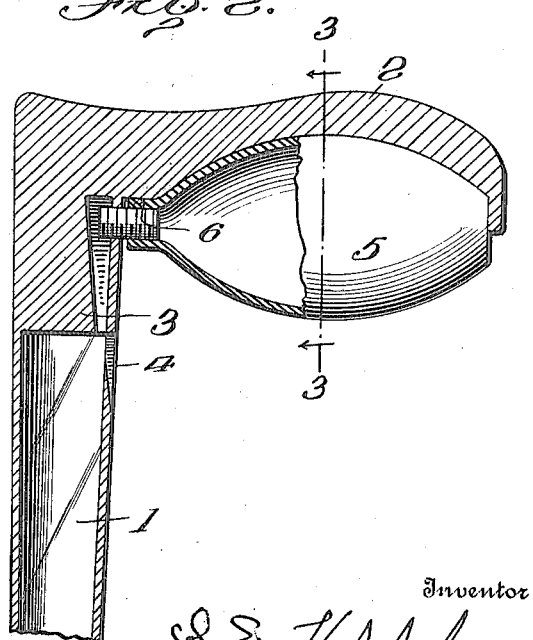

UNITED STATES PATENT OFFICE.

SAMUEL E. HOLDZKOM, OF LONGPORT, NEW JERSEY.

HANDLE FOR CANES, UMBRELLAS, AND OTHER ARTICLES.

1,196,545.  Specification of Letters Patent.  Patented Aug. 29, 1916.

Application filed December 6, 1915. Serial No. 65,315.

*To all whom it may concern:*

Be it known that I, SAMUEL E. HOLDZKOM, a citizen of the United States, residing at Longport, in the county of Atlantic and State of New Jersey, have invented certain new and useful Improvements in Handles for Canes, Umbrellas, and other Articles, of which the following is a specification.

This invention relates to certain improvements in handles for canes, umbrellas and other articles, and the objects and nature of the invention will be readily understood by those skilled in the art in the light of the following explanation of the accompanying drawings illustrating what I now believe to be the preferred embodiment or mechanical expression of my invention from among other forms, constructions and arrangements within the spirit and scope thereof.

An object of the invention is to provide an improved handle of efficient, practical and inexpensive design, for use on canes, umbrellas and other articles.

A further object of the invention is to provide an improved handle for canes, umbrellas and other articles provided with air forcing means.

A further object of the invention is to provide an improved handle formed of a backing portion and air forcing means carried thereby and partially incased therein.

A further object of the invention is to provide an improved handle having one portion formed by a concaved member and the other portion formed by a bulb fastened in the concaved member.

A further object of the invention is to provide an improved handle consisting in part of air forcing means so positioned as to be concealed when in the hand of the person using and operating said means.

A further object of the invention is to provide an improved handle for canes, umbrellas and other articles consisting in part, of means adapted to operate a wind instrument carried by, or incased in a cane, umbrella or other article.

A further object of the invention is to provide an improved handle, of the character hereinafter described, consisting of two members, one of which is adapted to produce a blast of air when pressure is exerted thereon.

The invention consists in certain novel features of construction and in arrangements of parts as more fully and particularly set forth and specified hereinafter.

Referring to the accompanying drawings:—Figure 1, is a perspective view of a cane provided with a handle of my invention operatively connected with a wind instrument formed within the cane and showing in dotted lines a hand operatively grasping the handle of the cane. Fig. 2, is a vertical longitudinal section of a cane provided with a handle embodying my invention. Fig. 3, is a vertical section taken on the line 3—3, Fig. 2.

Referring particularly to the accompanying drawings: wherein I disclose a handle of my invention adapted for use upon a cane provided with a wind instrument, in this instance, a whistle, and which is formed in the cane, I show the cane 1, provided with a handle formed of the backing member or portion 2, and the air forcing means or bulb 5. The cane below the handle is formed hollow and provided with an inlet opening at the upper end thereof. A whistle 3, is formed in the hollow of the cane and below the upper air inlet and having its air outlet at 4, through the stick of the cane.

The backing member or portion 2, of the handle is formed on its upper surface in a manner to adapt it to be grasped and conform to the hand. The under side of the portion 2 is concaved to conform to the shape of the bulb 5, and of a depth sufficient to receive approximately one-half the width or transverse thickness of the bulb. The bulb 5, is fastened to the concavity of the member 2, by any suitable means and with its lower half forming the lower half of the cane handle. The bulb 5 is fastened to the member 2, with its nozzle or nipple end 6, toward the cane stick and is connected with the hollow of the cane stick through the upper inlet opening hereinbefore referred to. Thus a handle of my invention embodies a backing member and a bulb, the bulb in the preferred embodiment forming the lower half of the handle and having approximately half its thickness incased by the backing member which is formed with a concavity in its under side conforming to the shape of the bulb.

The operation of my device is as follows: The handle formed of the portion 2, and the bulb 5, is grasped and when desiring to sound the whistle 3, the part of the hand resting upon and over the depending half of the bulb 5, is moved against the bulb in a sharp, quick manner causing a blast of air to be expelled from the bulb and into the upper end of the hollow in the cane stick. The blast of air then passes through the whistle 3, and out through the opening 4, causing the whistle to sound.

In operating my improved handle there is no interruption in the use of the cane, nor is there any other movement necessary than the slight movement of the fingers upon the bulb. Throughout the sounding of one blast or series of blasts the ordinary use of the cane is in no wise interfered with. Further, the lower part of the bulb 5, is concealed by the hand when in operation and bystanders are unable to detect its presence or distinguish the handle from the usual cane handle.

I have disclosed and described herein a handle embodying my invention applied to a cane of a certain structure, but I do not limit myself to this combination nor to the specific shape of my handle parts, nor to the exact positioning disclosed herein.

The nozzle or nipple end 6, may be operatively connected to any manner of wind instrument, placed in any position desired upon an article.

It is clear that my invention is adapted to a variety of combinations and uses and it is not my desire to limit myself to the specific disclosures hereof.

My device is one of simplicity of design, structure and operation. The backing member presents a solid part to press or squeeze the bulb against and thereby permits the most efficient results from the bulb. There are no sliding or other moving parts to wear and become out of order thereby preventing operation and impairing the quality of endurance in the handle and due to the handle being formed of but two simple parts the cost of manufacture is reduced to a minimum without in any way reducing the efficiency or practicability of my handle.

It is evident that various changes, modifications and variations might be resorted to without departing from the spirit and scope of my invention and hence I do not wish to limit myself to the exact disclosures hereof.

Desiring to protect myself in the broadest manner legally possible, what I claim is:—

1. A handle composed of an upper member and an air forcing bulb fixed thereto, depending therefrom and in continuation thereof to form the complete handle.

2. A handle composed of an upper rigid member having its under side concaved and an air forcing bulb fixed in said concavity and depending therefrom in continuation of said upper member whereby the said members form the complete handle.

3. In a cane, the combination of a handle composed of an upper member, an air forcing bulb constituting a lower member and fixed to said upper member in continuation thereof to form the complete handle, with a wind instrument carried by the upper portion of said cane adjacent said bulb and connected therewith by suitable air conveying means and said instrument adapted to be operated by said lower member, substantially as described.

4. In a cane, the combination of a handle composed of an upper rigid member, an air forcing bulb fixed to said upper member in continuation thereof to form a complete handle and having its discharge end toward said cane, with a wind instrument formed in the interior of said cane adjacent the discharge end of said bulb, and means connecting said bulb with said instrument, for the purposes substantially as described.

5. A cane provided with a laterally extending handle composed of an upper rigid member and a lower flexible air forcing bulb fixed to said upper member in continuation thereof, and said bulb having its discharge end at the inner end of said handle, a whistle formed in said cane having its air intake adjacent to and in alinement with said discharge from said bulb and its outlet through the wall of said cane below said handle, and a tube connecting said bulb with the intake of said whistle, for the purposes substantially as described.

Signed this 30 day of November, 1915.

SAMUEL E. HOLDZKOM.

Copies of this patent may be obtained for five cents each, by addressing the "Commissioner of Patents, Washington, D. C."